United States Patent [19]

Ray

[11] 4,211,955
[45] Jul. 8, 1980

[54] SOLID STATE LAMP

[76] Inventor: Stephen W. Ray, 616 Graydon Ave., Apt. 4, Norfolk, Va. 23507

[21] Appl. No.: 882,727

[22] Filed: Mar. 2, 1978

[51] Int. Cl.² ............................................. H05B 43/00
[52] U.S. Cl. ..................................... 315/53; 313/512; 313/500; 315/185 R; 315/205; 315/307; 315/312; 362/800
[58] Field of Search ...................... 315/51, 52, 53, 135, 315/291, 307, 185 R, 189, 200 R, 205, 312, 324; 313/498, 499, 512, 500; 362/800, 84; 307/311; 357/17; 250/552, 553

[56] References Cited

U.S. PATENT DOCUMENTS

| 2,780,746 | 2/1957 | Arnott | 313/498 X |
| 3,764,862 | 10/1973 | Jankowski | 313/499 X |
| 3,795,830 | 3/1974 | Richardson | 307/311 |
| 4,029,991 | 6/1977 | Schultz | 315/291 X |

OTHER PUBLICATIONS

Anantha et al., *Integrated Semiconductor Led Display Panel*, IBM Technical Disclosure Bulletin, vol. 16, No. 3, Aug. 1973, pp. 1018, 1019.
Klein et al., *Monolithic Integrated Alpha Numeric Display*, RCA Technical Notes, TN No. 753, Apr. 1968.
Bingham et al., *Current Sensor*, IBM Technical Disclosure Bulletin, vol. 18, No. 11, Apr. 1976, p. 3545.
Jacobus et al., *Visible Light-Emitting Diode*, IBM Technical Disclosure Bulletin, vol. 10, No. 8, Jan. 1968, p. 1120.

*Primary Examiner*—Eugene R. La Roche
*Attorney, Agent, or Firm*—Sughrue, Rothwell, Mion, Zinn and Macpeak

[57] ABSTRACT

An integrated circuit chip containing one or more light-emitting diodes is mounted within a light-diffusing encasement having a standard incandescent light bulb lamp base. The integrated circuit chip also contains a rectifier and voltage regulator circuit. The resulting solid state lamp may then be used to replace any standard incandescent light bulb, as it can be inserted in any existing standard A.C. or D.C. lamp sockets. The encasement may be a standard hollow light bulb, or, for maximum light diffusion, a solid transparent or translucent plastic in which the chip is embedded.

2 Claims, 7 Drawing Figures

SOLID STATE LAMP

BACKGROUND OF THE INVENTION

1. Field of the Invention

This invention relates to the field of solid state or semiconductor lamps and, more particularly, to a novel solid state lamp in which a solid state light-emitting device is disposed within a light-diffusing encasement having a standard A.C. or D.C. base which can be accepted by existing standard A.C. or D.C. lamp sockets.

2. Description of the Prior Art

Solid state light sources per se, such as light-emitting diodes, are well known in the prior art, but none of these is suitable as a complete replacement for a standard A.C. or D.C. incandescent lamp.

SUMMARY OF THE INVENTION

Therefore, the principal object of this invention is to provide a novel solid state lamp having a standard incandescent lamp base which can be used with existing incandescent lamp sockets.

Another object of the invention is to provide a novel solid state lamp in the form of a light-diffusing encasement containing an integrated circuit chip having one or more light-emitting diodes, and wherein the integrated circuit chip is electrically connected to a standard incandescent lamp base fixed to the bottom of the encasement.

Still another object of the invention is to provide such a novel solid state lamp wherein the integrated circuit chip contains rectifier and voltage regulator circuits so the lamp can be energized by standard house current of 120 volts A.C.

DETAILED DESCRIPTION OF THE PREFERRED EMBODIMENTS

Figure 1:
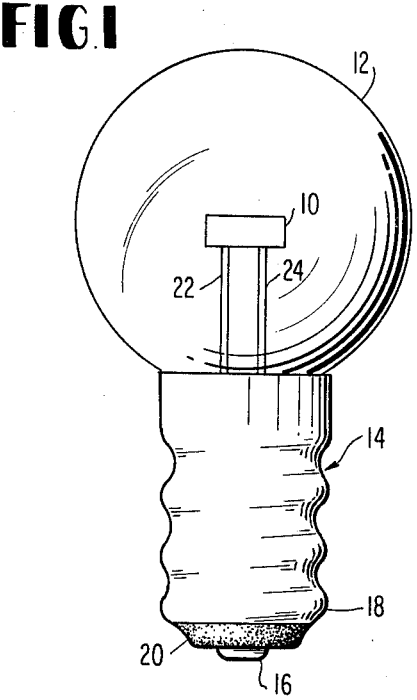
FIG. 1 is a front view of one embodiment of the invention wherein the solid state lamp is provided with a standard, screw-type A.C. lamp base.

FIG. 1 illustrates one embodiment of the invention wherein an integrated circuit chip 10 is mounted within a light-diffusing encasement in the form of a transparent hollow lamp bulb or envelope 12 which is sealed to a conventional incandescent lamp screw-type base 14 having an inner electrical terminal 16 separated from an outer electrical terminal 18 by circular insulating portion 20. Electrical conductors 22 and 24 are fixed to the lamp base 14 to mechanically support the chip 10 within the glass envelope 12 and to electrically connect the chip to the lamp base terminals 16 and 18, one of these terminals being connected to the chip conductor 22 and the other to the chip conductor 24.

As will be discussed in more detail below, the integrated circuit chip 10 contains one or more solid state light-emitting sources, such as light-emitting diodes, depending upon the desired light intensity. The chip 10 also contains integrated circuit rectifier and voltage regulator circuits to convert A.C. voltage to D.C. voltage and to regulate the D.C. voltage applied to the light-emitting diodes.

In operation, the solid state lamp of FIG. 1 is merely screwed into a standard screw-type lamp socket, thereby providing a visible-light source which is much more power-efficient than a standard incandescent lamp. To the casual observer, the solid state lamp of FIG. 1 looks like a conventional incandescent lamp bulb.

Figure 2:
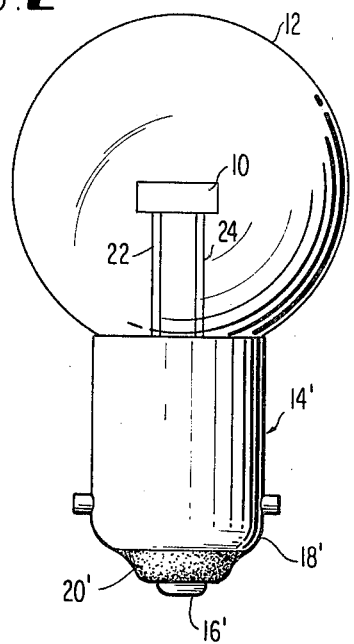
FIG. 2 is a front view of another embodiment of the invention wherein the solid state lamp is provided with a standard, lug-type D.C. incandescent lamp base.

FIG. 2 shows a solid state lamp similar to that of FIG. 1, except that the FIG. 2 embodiment employs a lug-type lamp base commonly used in D.C. environments, such as flashlights, automobile lights, etc. As in FIG. 1, the integrated circuit chip conductors 22 and 24 are electrically and mechanically connected to the lamp base 14', with one conductor being electrically connected to the electrical terminal 16' and the other to the electrical terminal 18' of the lamp base.

In other embodiments, the light-diffusing encasement is solid, rather than hollow, and this solid encasement provides maximum light diffusion. Such a solid encasement may have the form of the envelopes 12 in FIGS. 1 and 2, or may be of virtually any size or shape, and is made of a clear or translucent material such as acrylic plastic. The encasement may also be cast with a textured surface.

Figure 3:
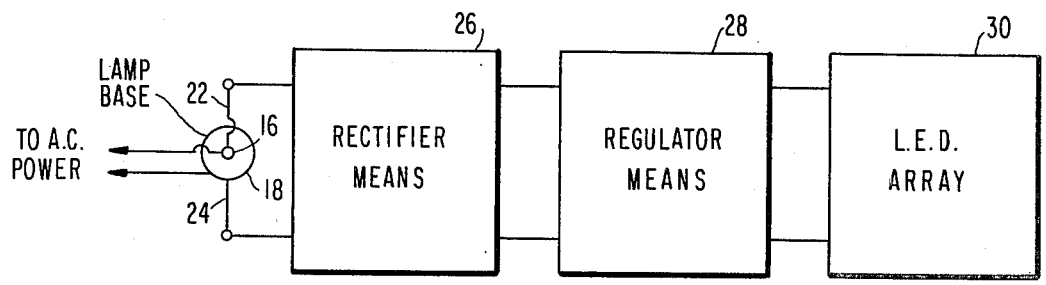
FIG. 3 is a schematic block diagram of the integrated circuit chip used in this invention.

FIG. 3 is a schematic block diagram showing the integrated circuit and the manner in which it is connected to the lamp base. The same reference numerals are used to indicate corresponding components in the various Figures. The integrated circuit consists of a rectifier means 26 for converting alternating current to direct current, a regulator means 28 for regulating the D.C. voltage supplied by the rectifier means 26, and an LED (light-emitting diode) array 40 which is energized by the output of the regulator means 28. In accordance with this invention, the so-called LED array may consist of one light-emitting diode (LED) or a plurality of series-connected LEDs, depending upon the light intensity required. The conductors or leads 22 and 24 of the integrated circuit chip 10 are schematically illustrated as being connected to the lamp base terminals 16 and 18, respectively. Of course, when the lamp base is inserted into a standard lamp socket, A.C. power may be applied across the lamp terminals 16 and 18 to energize the LED array 30.

Figure 4:
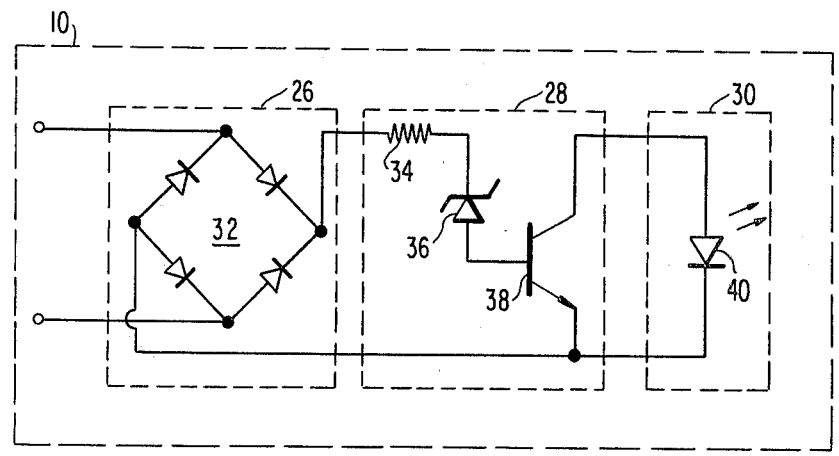
FIG. 4 is a schematic circuit diagram of an integrated circuit chip including a full wave rectifier and a shunt voltage regulator.

FIG. 4 is a schematic circuit diagram of one implementation of the block diagram shown in FIG. 3. More specifically, the rectifier means 26 is a full wave diode bridge rectifier 32 whose output is fed to a shunt regulator 28, in which a resistor 34 is connected in series with a Zener diode 36 and then to the base of an NPN transistor 38 whose output electrodes are connected across the LED array 30, illustrated in this case as containing a single LED 40.

Figure 5:
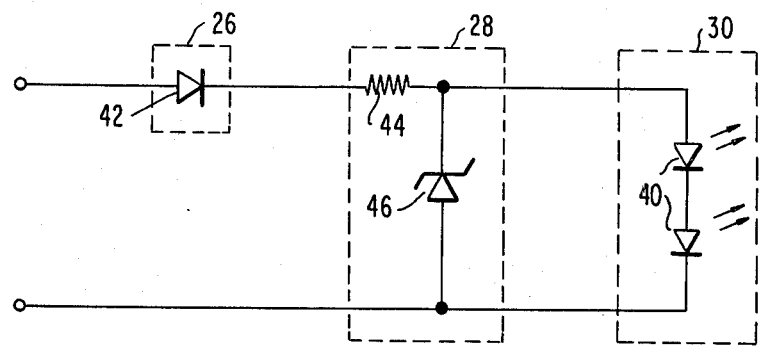
FIG. 5 is a schematic circuit diagram of an integrated circuit chip including a half wave rectifier and a shunt voltage regulator.

FIG. 5 is a schematic circuit diagram of another variation of FIG. 3. Here the rectifier means 26 is in the form of a half wave diode rectifier 42, the regulating means 28 is in the form of the resistor 44 and the Zener diode 46, and again the LED array 30 is in the form of one or more light-emitting diodes 40.

Figure 6:
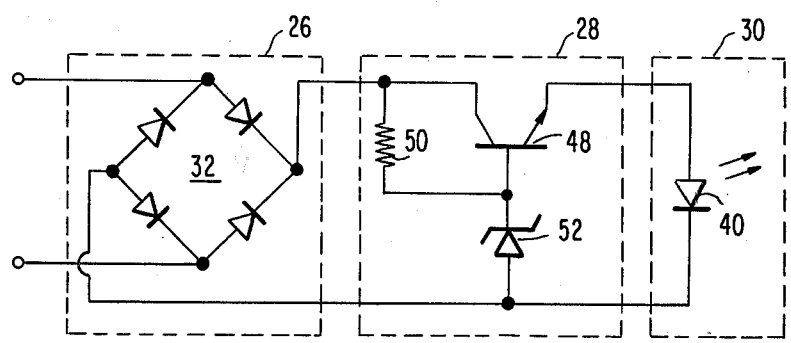
FIG. 6 is a schematic circuit diagram of an integrated circuit chip including a full wave rectifier and a series voltage regulator.

FIG. 6 is a schematic circuit diagram with still another variation of FIG. 3. Here the rectifier means 26 again is a diode bridge rectifier 32, the regulator means 28 comprises an NPN transistor 48 connected in series with the LED array 30, and further includes the resistor 50 and the Zener diode 52 connected as illustrated.

Figure 7:
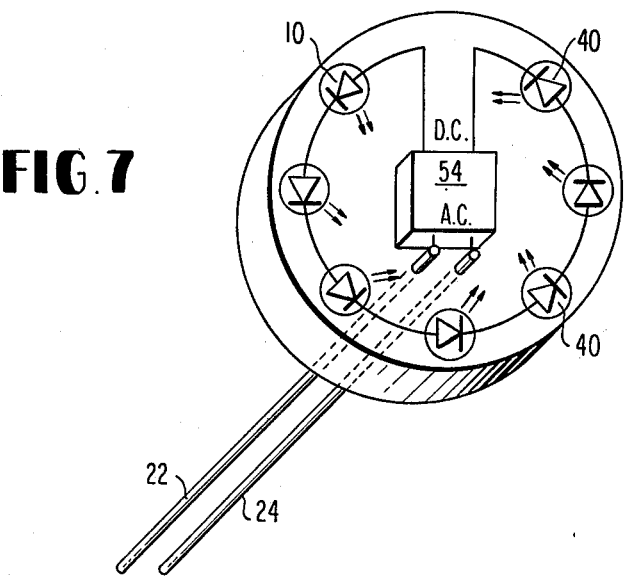
FIG. 7 is a pictorial representation of an integrated circuit chip containing a plurality of series-connected light-emitting diodes.

FIG. 7 is a pictorial representation of the integrated circuit chip 10 illustrating a plurality of light-emitting diodes 40 connected to the output of the rectifier and regulator means illustrated by the single block 54.

From the foregoing description, it can be seen that I have invented a novel solid state lamp which can replace any A.C. or D.C. incandescent light bulb with a standard lamp base. An integrated circuit chip, including light-emitting diodes, rectifier circuit and voltage regulator circuit, is mounted within a light-diffusing encasement which may be hollow or solid. The number of LEDs in the integrated circuit chip depends upon the desired light output and wattage output. My solid state lamp has the appearance of a standard light bulb to the untrained observer, but the solid state lamp is a far more efficient light emitter than incandescent light bulbs. Since my solid state lamp uses the same lamp bases as found on standard incandescent light bulbs, my lamp may be used in existing incandescent lamp sockets. Since my lamp includes a rectifier circuit, it can be used with either an A.C. or D.C. power source. The regulator circuit maintains the voltage applied to the light-emitting diodes at a constant level, thereby protecting the LEDs from transients occurring in the power source. As a result, my solid state lamp would have a virtually infinite lifespan.

I claim:

1. An area-illuminating solid state lamp comprising:
   a light-diffusing encasement having a standard incandescent lamp base generally in the form of a cylinder;
   a pair of electrical conductors whose lower ends are electrically secured to said base and whose upper ends extend into said encasement and mechanically support a discrete light-emitting solid state device;
   said solid state device comprises an integrated circuit chip having a diode rectifier circuit, a plurality of series-interconnected light emitting diodes electrically coupled to said rectifier circuit by a voltage regulator circuit electrically connected between said rectifier and said plurality of light-emitting diodes;
   said integrated circuit chip being electrically connected to and mechanically supported on said conductors within said encasement; and
   said encasement being solid translucent plastic.

2. An area-illuminating solid state lamp as defined in claim 1 wherein said plurality of light-emitting diodes are arranged in a circular array on said chip.

* * * * *